United States Patent
Baldini et al.

(10) Patent No.: US 8,885,655 B2
(45) Date of Patent: Nov. 11, 2014

(54) SWITCHING MATRIX FOR INTERCONNECTING AN ACCESS NETWORK AND OPERATOR NETWORKS

(75) Inventors: Luca Baldini, Rome (IT); Marco Listanti, Rome (IT)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 188 days.

(21) Appl. No.: 13/805,340

(22) PCT Filed: Jul. 14, 2010

(86) PCT No.: PCT/EP2010/060134
§ 371 (c)(1),
(2), (4) Date: Mar. 14, 2013

(87) PCT Pub. No.: WO2011/157304
PCT Pub. Date: Dec. 22, 2011

(65) Prior Publication Data
US 2013/0208730 A1  Aug. 15, 2013

(30) Foreign Application Priority Data

Jun. 18, 2010 (EP) .................................. 10166459

(51) Int. Cl.
| | |
|---|---|
| H04L 12/28 | (2006.01) |
| H04L 12/933 | (2013.01) |
| H04Q 3/68 | (2006.01) |
| H04L 12/937 | (2013.01) |
| H04L 12/947 | (2013.01) |

(52) U.S. Cl.
CPC ............ *H04L 49/1515* (2013.01); *H04L 49/254* (2013.01); *H04Q 2213/1304* (2013.01); *H04Q 2213/1302* (2013.01); *H04L 49/25* (2013.01); *H04Q 3/68* (2013.01); *H04Q 2213/1301* (2013.01); *H04Q 2213/13298* (2013.01); *H04L 49/253* (2013.01)
USPC ........................................................ 370/401

(58) Field of Classification Search
CPC ......... H04L 65/00; H04L 45/00; H04L 45/02; H04L 12/66; H04L 2012/46; H04L 2012/5618; H04L 45/04
USPC ......... 370/203, 208, 229, 230, 241, 250, 252, 370/351, 389, 392, 400, 401, 419, 420
See application file for complete search history.

(56) References Cited

U.S. PATENT DOCUMENTS

| | | | |
|---|---|---|---|
| 6,954,426 B2 * | 10/2005 | Suominen | 370/230 |
| 7,020,087 B2 * | 3/2006 | Steinberg et al. | 370/238 |
| 7,310,333 B1 | 12/2007 | Conklin et al. | |
| 7,920,691 B2 * | 4/2011 | Chu et al. | 379/221.01 |
| 2002/0039360 A1 * | 4/2002 | Mazzurco et al. | 370/360 |

OTHER PUBLICATIONS

International Search Report, Application No. PCT/EP2010/060134, dated Nov. 12, 2010, 2 pages.
M. Kubale et al., "Worst-Case Analysis of Some Algorithms for Rearranging Three-Stage Connection Networks," Oct. 17-24, 1979, 6 pages, Ninth International Teletraffic Congress, Spain.

* cited by examiner

*Primary Examiner* — Anh Ngoc Nguyen
(74) *Attorney, Agent, or Firm* — Blakely Sokoloff Taylor & Zafman LLP

(57) ABSTRACT

A switching matrix connects to an access network and a set of at least two operator networks. A controller performs a method of establishing new connections across the switching matrix in response to new connection requests. The new connection requests involve a sub-set of the set of operator networks. The controller determines if the new connections can be established across the switching matrix by rearranging only existing connections across the switching matrix to the sub-set of operator networks and, in response, establishes the at least one new connection. Otherwise, the controller rearranges existing connections across the switching matrix to at least one other of the set of operator networks to establish the new connections. The controller minimizes the number of other operator networks which are involved when rearranging existing connections. The switching matrix can be a Clos switching matrix.

22 Claims, 11 Drawing Sheets

SWITCHING MATRIX FOR INTERCONNECTING AN ACCESS NETWORK AND OPERATOR NETWORKS

CROSS-REFERENCE TO RELATED APPLICATIONS

This application is a National stage of International Application No. PCT/EP2010/060134, filed Jul. 14, 2010, which claims priority to EP Application No. 10166459.7, filed Jun. 18, 2010, which are hereby incorporated by reference.

TECHNICAL FIELD

This invention relates to switching traffic at a switching matrix between access networks and operator networks. Embodiments relate to a multi-stage switching matrix, such as a Clos matrix.

BACKGROUND

Communications traffic at network edges is increasing over time due to the rising demand for a range of high-bandwidth services by business and residential customers. This rising demand places an increasing requirement on access networks to deliver those services. There is interest in deploying high-capacity optical access networks, such as Passive Optical Networks (PON), to replace copper access networks.

In open markets, such as Europe, an important requirement is that a subscriber should be able to freely choose an operator network to supply their communication services. This is called Local Loop Unbundling. A Central Office connects to the access network and also connects to multiple operator networks. While this freedom of selecting an operator network is desirable for a user, it poses a problem for network equipment at the Central Office as traffic from the access network must be able to connect to one of a set of operator networks, as required by a subscriber.

SUMMARY

A first aspect of the present invention provides a method of controlling a switching matrix which connects to an access network and a set of at least two operator networks. The switching matrix has existing connections established between subscriber terminals and the operator networks. The method comprises receiving at least one request for a new connection between a subscriber terminal in the access network and one of the operator networks, the at least one new request involving a sub-set of the set of operator networks. The method further comprises establishing the at least one new connection across the switching matrix by determining if the at least one new connection can be established across the switching matrix by rearranging only existing connections across the switching matrix to the sub-set of operator networks and, in response, establishing the at least one new connection. Otherwise, the method rearranges existing connections across the switching matrix to at least one other of the set of operator networks to establish the at least one new connection.

Traffic is switched between subscriber terminals in the access network and multiple operator networks by the switching matrix. Establishing a new connection across the switching matrix may require one or more existing connections across the matrix to be rearranged. The method has an advantage of minimising disruption to existing connections at the switching matrix. Where possible, the method only rearranges existing connections of the operators involved in the new connections that are being established. When there is a single request for a new connection, the sub-set of operator networks will be one operator network. When there is a plurality of requests for new connections, the sub-set of operator networks can be one operator network (if all of the requests are for connections to the same operator network) or more than one operator networks (if the requests are for connections to different operator networks).

The request for a new connection can be at least one of: (i) a request for a new connection between a new subscriber terminal and an operator network; and a request for a new connection between an existing subscriber terminal and (ii) an operator network which is not currently serving the subscriber terminal.

Advantageously, the step of establishing the new connection comprises an initial step of determining if the at least one new connection can be established across the switching matrix without rearranging any existing connections across the switching matrix and, in response, establishing the at least one new connection. This further reduces disruption.

Advantageously, the step of establishing the new connections by rearranging existing connections to at least one other of the set of operator networks determines if the new connections can be established by rearranging existing connections across the switching matrix to the sub-set of operator networks and one of the other operator networks. If not, the method iteratively allows the rearranging step to rearrange existing connections of a further one of the operator networks which is not involved in the new connections until a connection can be established. This has an advantage of rearranging existing connections of only a minimal number of other operator networks when establishing the new connections.

The step of receiving a request can comprise a plurality of requests for new connections between subscriber terminals in the at least one access network and a sub-set of the set of operator networks. The establishing comprises determining if the new connections can be established across the switching matrix by rearranging only existing connections across the switching matrix to the sub-set of operator networks which are involved in the new connections and, in response, establishing the new connections. Otherwise, the method proceeds to establish the new connections by rearranging existing connections to at least one other of the operator networks which is not involved in the new connections.

Advantageously, the multi-stage switch is a rearrangeable non blocking (RNB) switching matrix. This means that the switching matrix can always support a connection between any free ingress and any free egress of the matrix by rearranging the existing connections.

Advantageously, the multi-stage switch is a Clos switching matrix. The multi-stage switching matrix can comprise three stages. The first stage and second stage can comprise crosspoint arrays. The first stage and second stage together form the rearrangeable non blocking (RNB) switching matrix.

Advantageously, each module in the final (e.g. third) stage of the switching matrix is dedicated to a particular operator network. This has an advantage that the final stage module does not need to switch traffic to a specific output port, and simply "collects" traffic from the previous stages of the switching matrix.

The switching matrix can operate in the electrical domain or optical domain.

The switching matrix can connect to any Point-to-Point access network. The first stage of the switching matrix has a plurality of ports which each connect to a particular subscriber terminal in the access network. The switch matrix can connect to a logical Point-to-Point access network, such as a Wavelength Division Multiplexed Passive Optical Network (WDM-PON). In a Wavelength Division Multiplexed Passive Optical Network (WDM-PON) wavelength channels, called lambdas, are allocated for communication between a Central Office (CO) and each optical terminal in the WDM-PON. Each user has a virtual point-to-point wavelength based connection. This allows operator networks to provide different data rates and/or different protocols to users. Each wavelength channel is terminated and connected to a port of the switching matrix. The switching matrix can connect to a physical Point-to-Point access network, such as Point to Point fiber access network, where a dedicated fibre connects between a Central Office and each subscriber terminal. Each fibre is terminated and connected to a port of the switching matrix. The switching matrix can connect to any combination of these different types of access network equipment at the same time. The switching matrix can connect to other types of access network where the capacity of a fibre is shared between multiple subscriber terminals, such as on a time-division basis, with separate timeslots carrying traffic for different subscriber terminals. The shared fibre is terminated and an input/output corresponding to each subscriber terminal is connected to a different port of the switching matrix.

Another aspect of the present invention provides a switching matrix comprising ports for connecting to an access network and a set of at least two operator networks. The switching matrix also comprises a controller which is arranged to receive at least one request for a new connection between a subscriber terminal in the access network and one of the operator networks, the at least one new request involving a sub-set of the set of operator networks. The controller is further arranged to establish the at least one new connection across the switching matrix by determining if the at least one new connection can be established across the switching matrix by rearranging only existing connections across the switching matrix to the sub-set of operator networks and, in response, establishing the at least one new connection. Otherwise, the controller is arranged to rearrange existing connections across the switching matrix to at least one other of the set of operator networks to establish the at least one new connection.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIGS. 8A to 8E show a worked example of establishing a connection across the switching matrix.

DETAILED DESCRIPTION

Figure 1:
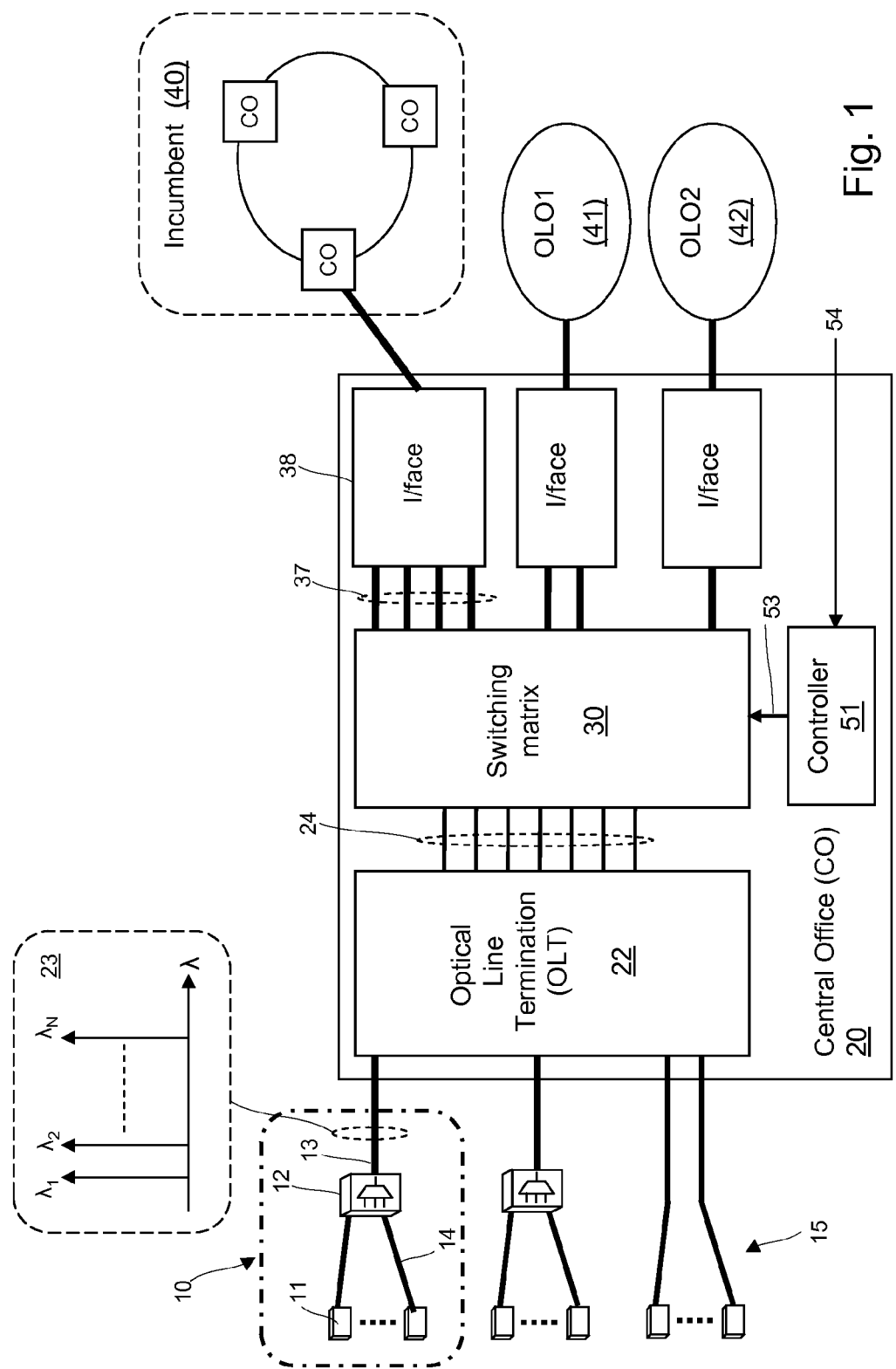
FIG. 1 shows an access network connecting to multiple operator networks using a switching matrix according to an embodiment of the invention.

FIG. 1 shows a communications system according to an embodiment of the present invention. A Central Office (CO) 20 connects to an optical access network. The optical access network can comprise one or more types of access equipment. In FIG. 1 the optical access network comprises wavelength division multiplexed passive optical networks (WDM-PON) 10 and a point-to-point fibre access network 15. The WDM-PON 10 comprises a plurality of Optical Network Units (ONU) 11, also called Optical Network Terminals (ONT). The ONUs are deployed at individual subscriber premises or at cabinets serving a plurality of premises, depending on the type of PON architecture.

The Central Office comprises optical line termination units (OLT) 22. The Central Office 20 also interfaces with operator networks 40-42, which can be metro or core communication networks. Operator networks 40-42 belong to different telco providers who can compete to offer a communications service to subscribers served by the WDM-PONs 10. One such network 40 is shown in more detail in FIG. 1. Typically, the first operator 40 is known as the incumbent, and other operators 41, 42 are known as Other Licensed Operators (OLO).

In a wavelength division multiplexed passive optical network (WDM-PON) multiple wavelength channels, called lambdas $\lambda$, are allocated for communication between the Central Office 20 and ONUs 11. In an advantageous scheme, a single lambda is allocated for communication between the Central Office 20 and a single ONU 11. A set of wavelength channels are carried between the OLT and a remote node 12 on a common fibre 13, and then passively demultiplexed at the remote node 12 onto a set of fibres 14. Each fibre 14 carries a single wavelength channel to an ONU 11. Bi-directional communication can be achieved in various ways, such as by the use of two wavelength channels to each ONU (i.e. one wavelength channel for downstream communication and a different wavelength channel for upstream communication) or by time-division multiplexed use of a single wavelength channel.

OLT 22 supports an optical interface 23 with the set of ONUs 11 in a PON 10. OLT 22 connects to fibre 13 and transmits/receives on a set of optical wavelength channels. Each optical wavelength channel is terminated at the Optical Line Termination unit (OLT) 22 at the CO 20. The OLT 22 also has a set of electrical ports 24. Each port 24 is an input or output path to an individual one of the ONUs 11. Typically, there is a 1:1 relationship between ports 24 and ONUs 11. OLT 22 has an optical transmitter which modulates an optical source using an electrical signal representing data to be transmitted, received from a port 24. The OLT 22 also has an optical receiver which detects a data signal carried by the optical wavelength channel and outputs the data as an electrical signal to a port 24. Typically, data is carried over a wavelength channel by phase, frequency or intensity modulation of an optical source. There can be a plurality of OLT units 22, such as an OLT unit 22 for each WDM-PON 10. Advantageously, there is a port 24 for each ONU 11 in the access network or a port 24 for each direction of communication per ONU 11, giving two ports per ONU 11.

Switching matrix 30 of the CO 20 connects to the electrical ports 24 of the OLT 22 and has a set of ports 37 for connecting with each of the operator network interfaces 38. The switching matrix 30 allows interconnections between any port 24, representing traffic to/from an individual ONU 11, and any operator network 40-42. The switching matrix 30 routes traffic between a particular operator and all ONUs 11 requiring service from that operator. A set of ports 37 are shown connecting with an interface 38 to the incumbent operator network 40. Another set of ports of switching matrix 30 connect with an interface to the operator OLO1 and a further set of ports of switching matrix 30 connect with an interface to the operator OLO2. The switching matrix 30 comprises a plurality of sequential switching stages shown in FIGS. 2 and 3. Switching matrix 30 performs switching of signals between ONUs 11 and operator networks 40-42 in the electrical domain.

A controller 51 configures the switching matrix 30 in response to external input signals 54 which specify what connectivity is required from the CO, e.g. ONUx requires service from OLO1, ONUy requires service from OLO2. Controller 51 outputs control signals 53 to configure the switching matrix to provide the required connectivity. Controller 51 can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions.

Interface apparatus 38 is provided for each operator network 40-42. Typically, an operator interface 38 will use some form of multiplexing (aggregation) to combine the individual connections to/from for each ONU and may also use concentration (i.e. compression, or bit-rate reduction) to reduce the bit rate of individual connections, or the combined set of connections.

Figure 2:
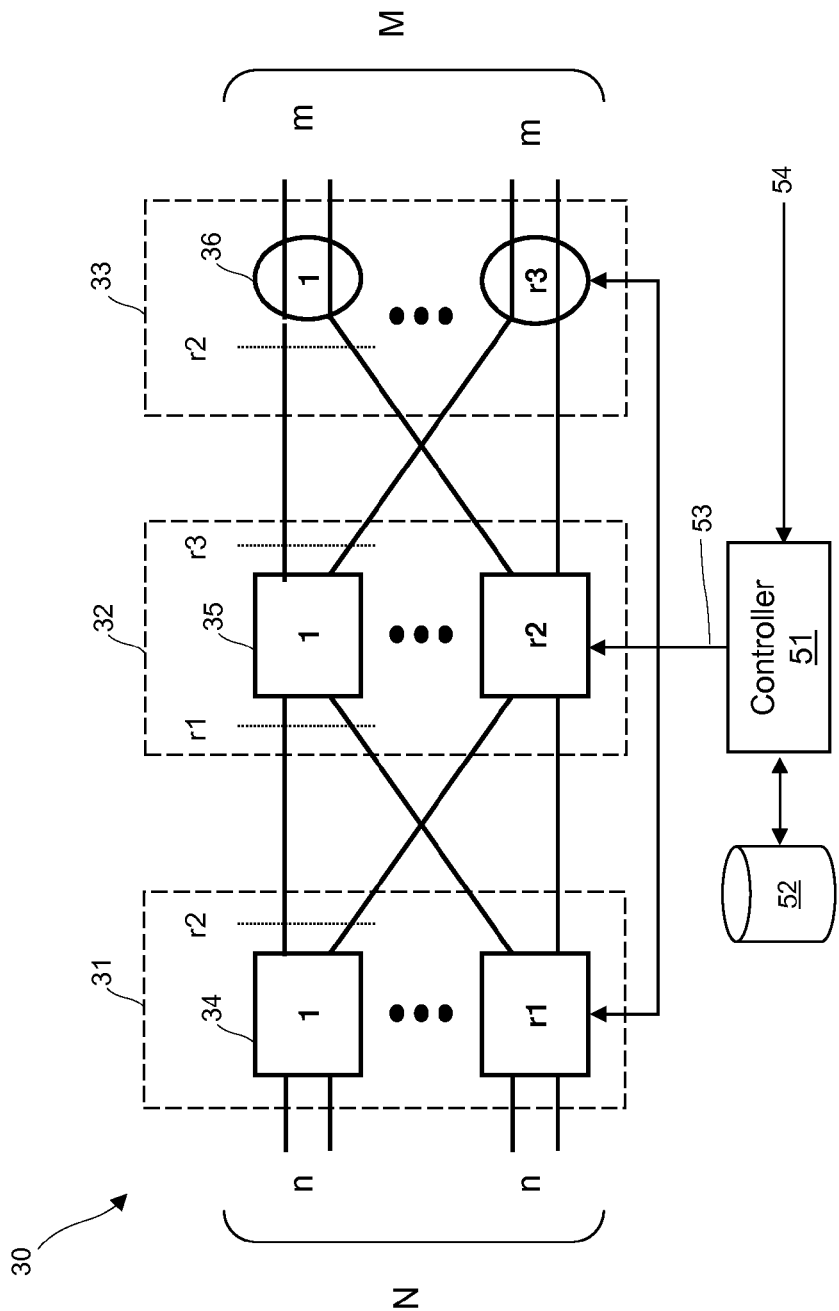
FIG. 2 shows the switching matrix of FIG. 1.
Figure 2A:
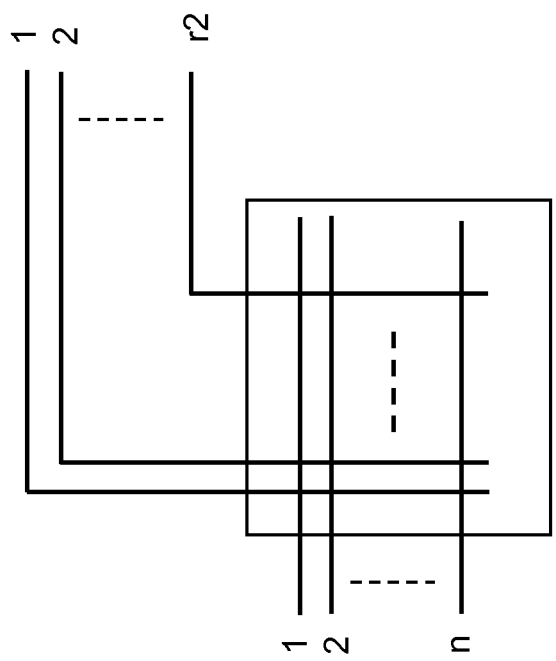
FIG. 2A shows a cross-point switching array of a module of the switching matrix of FIG. 2.

The following description concerns the switching matrix 30. FIG. 2 shows a multi-stage switching matrix 30 comprising three stages 31, 32, 33. The first stage 31 of the switching matrix 30 comprises r1 modules 34. Each module 34 has n ports on a first (access network-facing) side of the first stage 31. Each port carries traffic to/from a particular subscriber of the access network. Each module 34 has r2 ports on the second side, for connecting to the second stage 32. Each module 34 comprises a Strictly Non Blocking (SNB) switching device, such as a cross-point switching array. FIG. 2A shows a cross-point switching array within one of the first-stage modules 34 of the switching matrix. Each of the n ports connects to a line of the cross-point array. Each of the r2 ports connects to a column of the cross-point array. Switches are positioned at the intersection of each line and column. By selectively activating a switch, a particular one of the n ports (i.e. a subscriber) is connected to a particular one of the r2 ports (i.e. a second-stage module 35).

The second stage 32 of the switching matrix 30 comprises r2 modules 35. Each module 35 has r1 ports on the first side, for connecting to the r1 modules of the first stage 31, and r3 ports on the second side, for connecting to the third stage. Each module 35 comprises a switching array, such as a cross-point switching array. The third stage 33 of the switching matrix 30 comprises r3 modules 36. Each module 36 has r2 ports on the first side, for connecting to the r2 modules of the second stage 32, and m ports on the second side. Each module 36 connects to an operator network. Each module 36 can connect to a different operator network, or there can be multiple modules 36 connecting to a particular operator network. The switching matrix can comprise a three-stage Clos switching network where the modules 36 in the third stage 33 have no switching capabilities. That is, each of the r2 ports of an module 36 connects to a particular one of the m ports in a fixed relationship. As each module of the third stage is dedicated to one operator, there is no need to switch connections within the same module 36. The overall switching matrix 30 is rearrangeable non-blocking if the condition: $r2 \geq \max(n,m)$ is satisfied, according to the Slepian-Duguid theorem. Stated another way, it is possible to rearrange connections across the matrix in a non-blocking manner as long as the number of modules 35 in the second stage 32 is greater than the higher of n or m.

Figure 3:
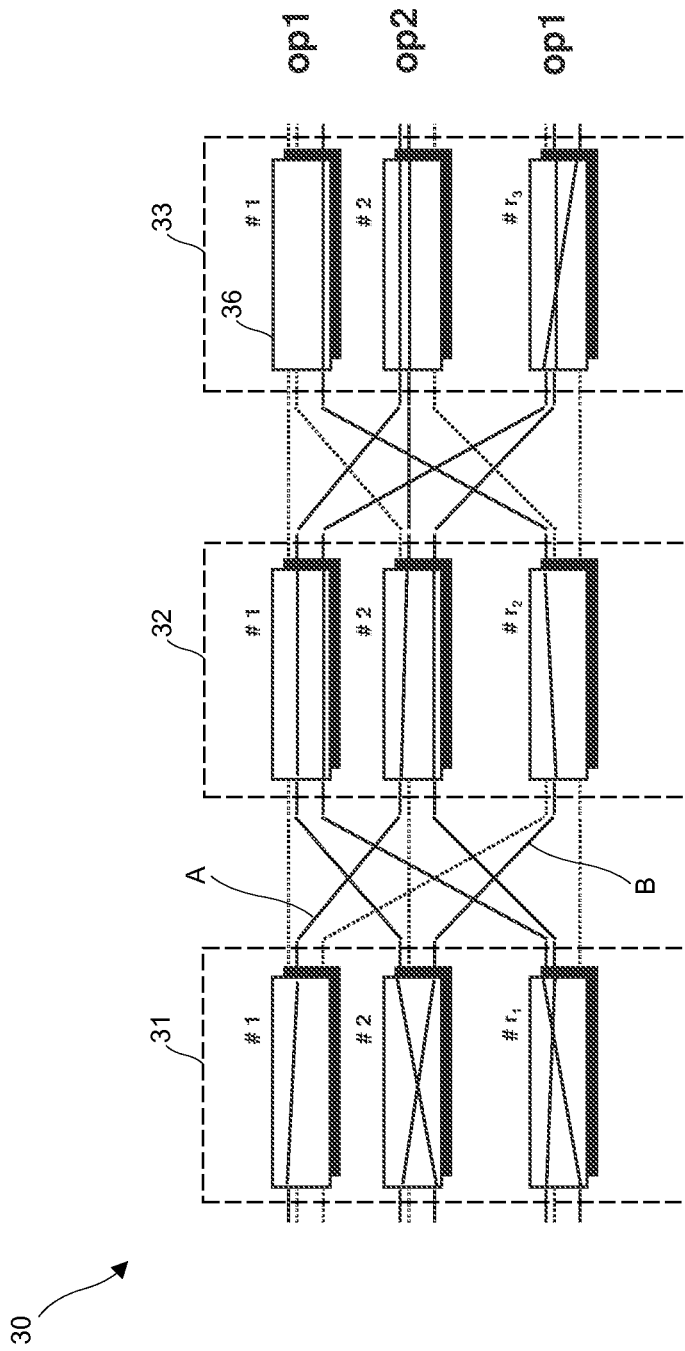
FIG. 3 shows a switching matrix with connections established across the switching matrix.

FIG. 3 shows an example switching matrix 30 with third stage modules 36 connected to two different operator networks op1, op2. There are some connections already established across the matrix. There is a connection A between module #1 in the first stage 31, via module #2 in the second stage 32, to module #2 in the third stage 33, which is connected to operator network op2. There is also a connection B between module #2 in the first stage 31, via module #r2 in the second stage 32, to module #1 in the third stage 33, which is connected to operator network op1, and so on.

Figure 4:
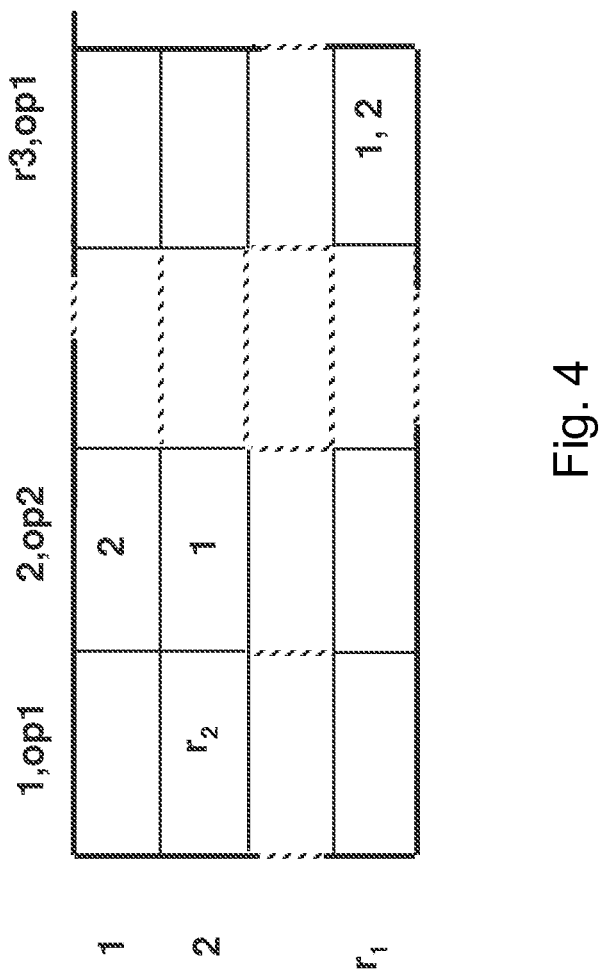
FIG. 4 shows a Paull matrix describing the configuration of the switching matrix of FIG. 3.

The connection status of the switching matrix 30 can be described by a Paull Matrix. This is a mathematical matrix with r1 rows and r3 columns, where the (i,j) entry of the Paull matrix contains the symbols corresponding to the second stage modules 35 seized by the connection between module "i" of the first stage 31 and module "j" of third stage 33. FIG. 4 shows a Paull matrix for the switching matrix of FIG. 3. It can be seen that entry (1,2) of the matrix (i.e. row=1, column=2) contains the value "2". This means that module #2 in the second stage 32 is used by a connection between module #1 in the first stage and module #2 in the third stage. This corresponds to connection A of FIG. 3. Other entries of the Paull Matrix can be derived in a similar manner. The Paull matrix is used to establish connections across the switching matrix.

Figure 5:
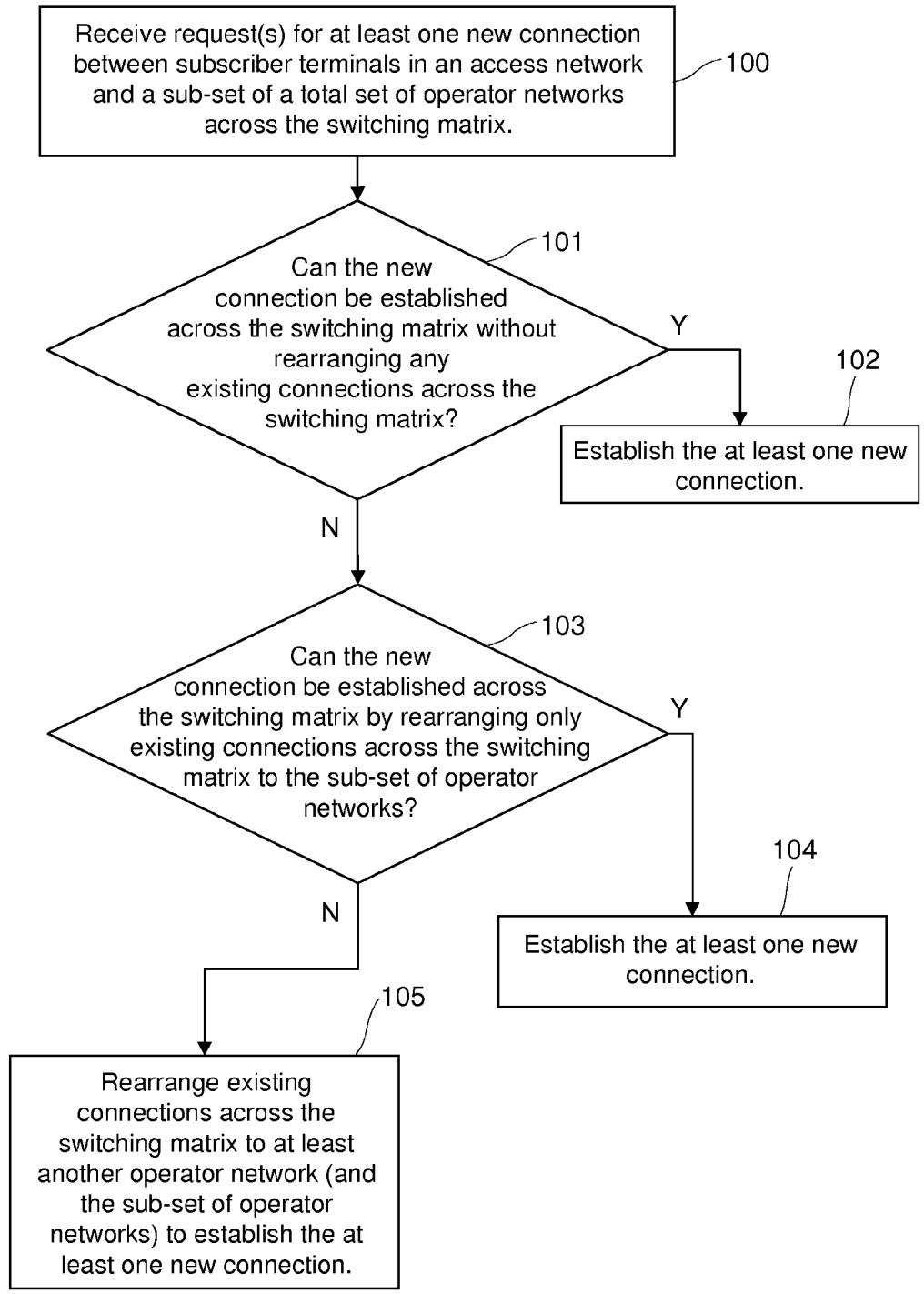
FIGS. 5 and 6 show a method of establishing connections across a switching matrix according to an embodiment of the invention.

FIG. 5 shows an overview of a method of establishing connections across the switching matrix 30, which is performed by the controller 51. The switching matrix connects to a set of (at least two) operator networks. At step 100 a request is received for at least one new connection. Each request is for a new connection between a subscriber terminal in the access network and an operator network, and will be established across the switching matrix 30. The requests involve a sub-set of the set of operator networks. For example, the switching matrix can connect to a set of two operator networks and there can be a single request for a new connection to one of the operator networks. In another example, the switching matrix can connect to a set of four operator networks and there can be three requests for new connections, which involve two of the operator networks. A preliminary step 101 of the method determines if the new connection, or connections, can be established across the switching matrix without rearranging any existing connections across the switching matrix. If so, the method proceeds to step 102 and establishes the new connection(s) in this way. Step 103 determines if the new connection, or connections, can be established across the switching matrix by rearranging only existing connections across the switching matrix to the sub-set of operator networks involved in the requests. If so, the method proceeds to step 104 and establishes the new connection(s) in this way. If the determination at step 103 is negative, the method proceeds to step 105 and establishes the new connection by rearranging existing connections across the switching matrix to at least one other of the operator networks, which is not part of the sub-set of operator networks involved in the requests.

As explained above, the method can be applied to a switching matrix which connects to two operator networks, or a larger number of operator networks. The method can be performed in response to a single request for a new connection. Alternatively, the method can be performed in response to a batch of at least two requests for new connections. This has an advantage of minimising disruption to the connections, and can occur at a scheduled time (e.g. once per week).

Figure 6:
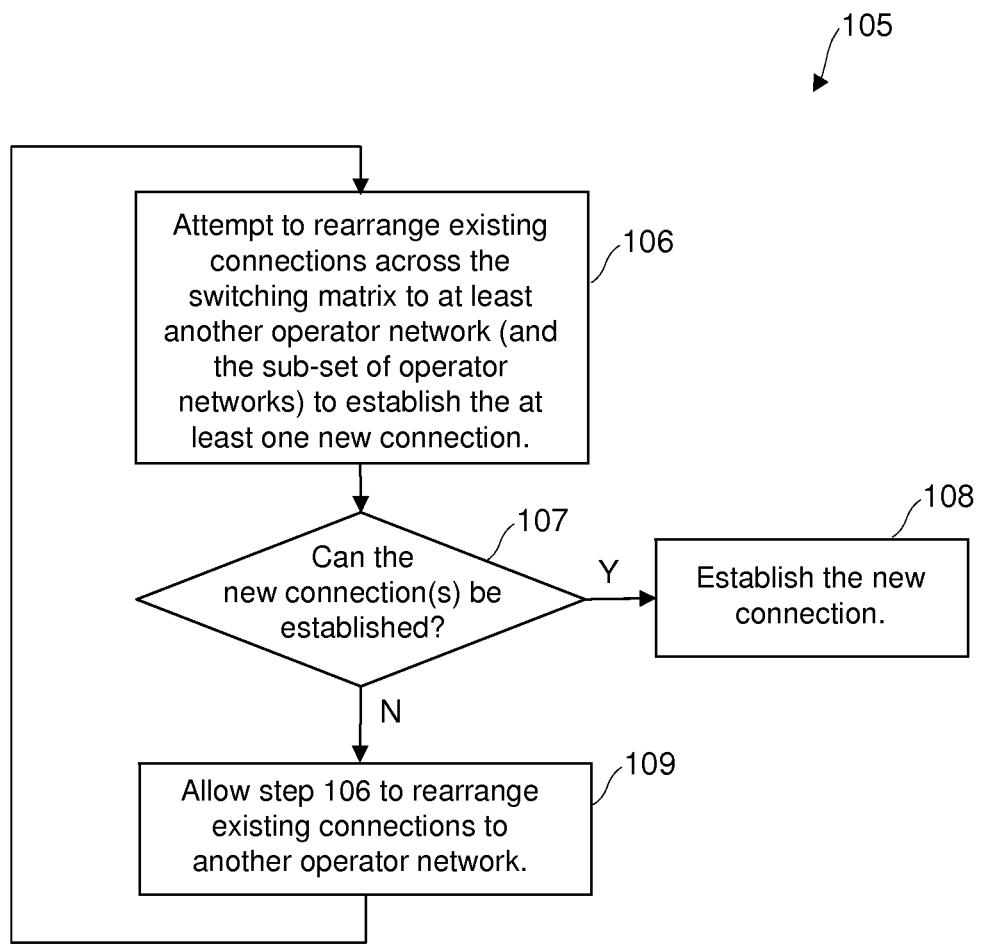

FIG. 6 shows additional detail of step 105 of FIG. 5. Firstly, step 106 attempts to rearrange existing connections across the switching matrix to at least another operator network (and the sub-set of operator networks) to establish the at least one new connection. Step 107 determines if the new connection(s) can be established. If so, the method proceeds to step 108 and establishes the new connection(s) in this way. If the determination at step 107 is negative, the method proceeds to step 109 and allows step 106 to rearrange existing connections across the switching matrix to at least one further operator network. The method returns to step 106 and attempts to rearrange existing connections across the switching matrix to establish the new connection(s). Step 106 rearranges existing connections of the increased number of operator networks permitted by step 109. The method continues iteratively until step 107 determines that the new connection(s) can be established. A new connection will be established because the switching matrix meets the rearrangeable non-blocking condition, i.e. $r2 \geq \max(n,m)$.

Figure 7A:
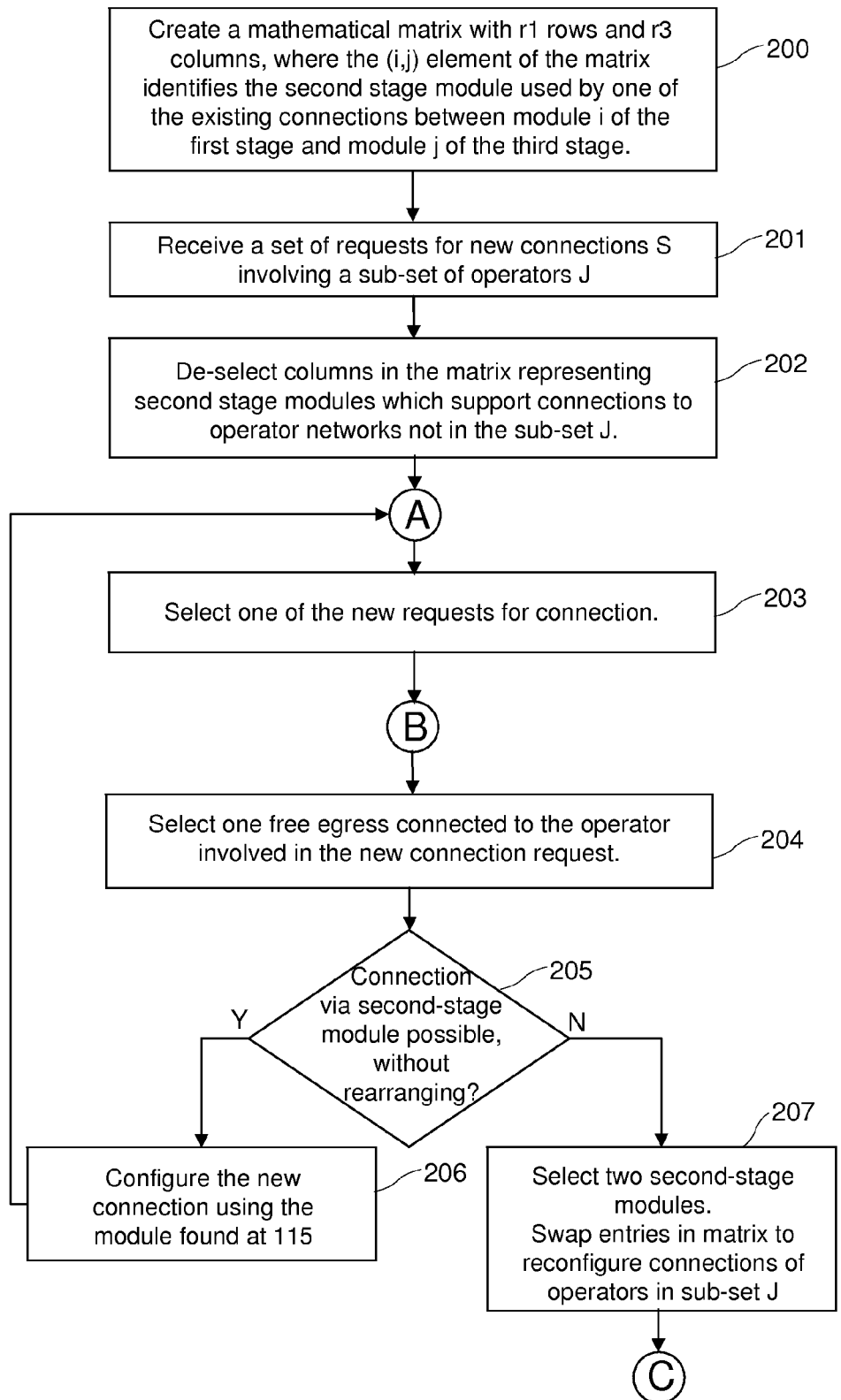
FIGS. 7A and 7B show a method of establishing connections across the switching matrix in detail.
Figure 7B:
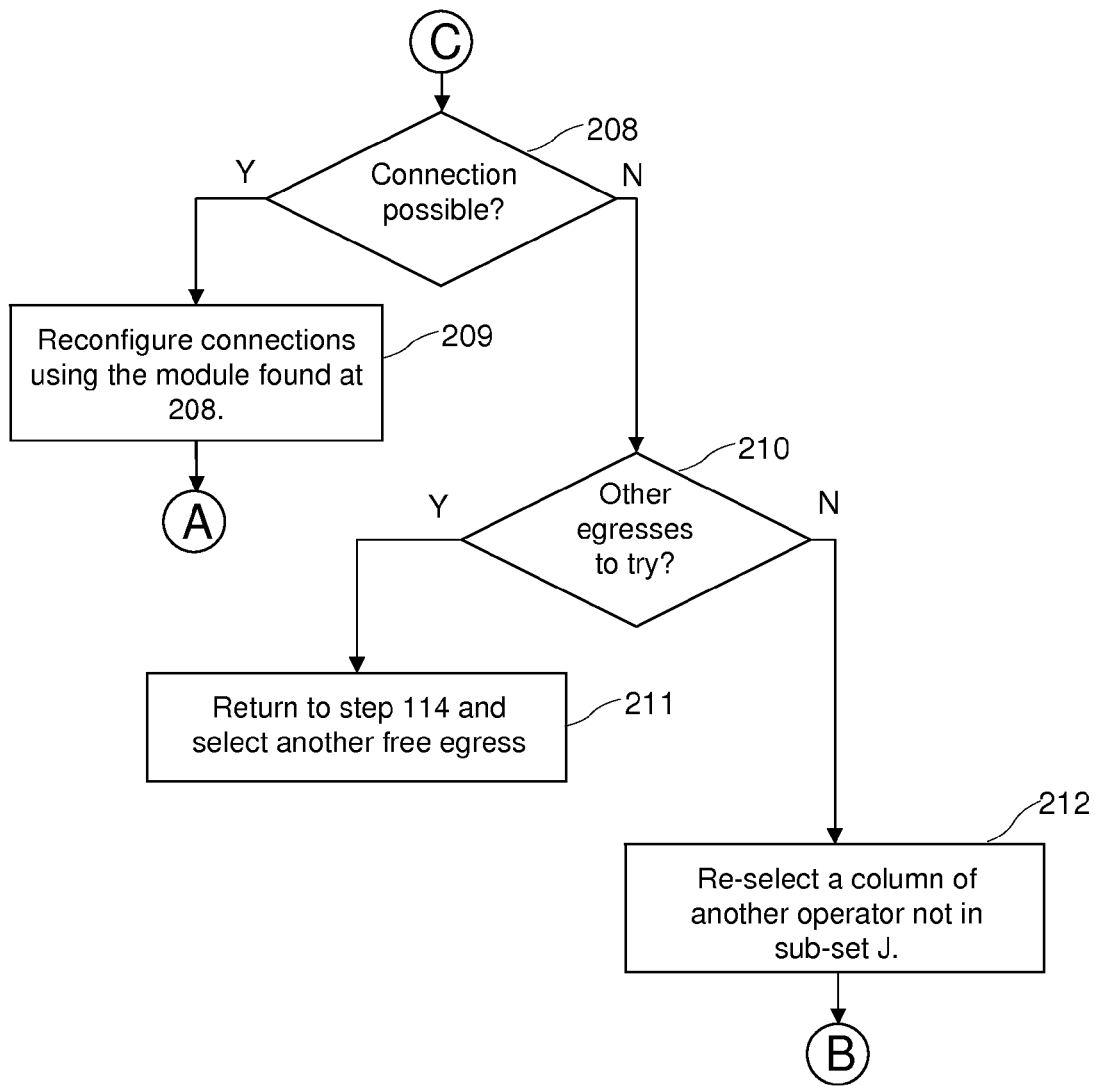

FIGS. 7A and 7B show the method of establishing connections in detail. The method uses a Paull Matrix, as described earlier, to record the connection status of the switching matrix. In the unbundling switching matrix 30, each module 36 of the third stage 33 is dedicated to a single operator. The Paull Matrix is modified to represent this information. Thus, every column contains a label indicating which operator the column (i.e. the module of the third stage) belongs to. Each operator can connect to one or more modules 36 of the third stage. Let us call OGj the group of egress connections belonging to the operator "j".
Thus:

$$OGj = Rj(j,1) \cup Rj(j,2) \cup \ldots Rj(j,K) = \bigcup_{k=1}^{K} Rj(j,k)$$

where Rj(j,k) are the egress connections of the k-th module of the third stage owned by operator j and $\cup$ denotes the union operation.

There is a need to find a path P(i,OGj) which connects the subscriber "i" to one egress connection in the set OGj of the desired operator "j", provided that the ingress is free and there is at least one free egress within the set OGj. Ideally, the establishment of the switching path P(i,OGj) should be made without rearranging the existing connections belonging to other operators:

$$P = \bigcup_{z \neq i, y \neq j} P(z, OGy).$$

The need for a connection establishment can arise when either: a new subscriber is added to the network of operator j; or a subscriber i wishes to move from an existing operator to operator j (an unbundling operation).

Let us call the set of new connections requested by an aggregated operation:

$$S = \bigcup_{i \in I, j \in J} P(i, OGj(i))$$

where I is the set of subscribers to be connected and J is the set of operators involved in the connection requests.

The Paull matrix M is created at step 200. The method to establish the connections S then proceeds as follows:

1. All columns of the Paull matrix M corresponding to operators not in the set J are "de-selected" or "frozen" (step 202).
2. Select a new connection P(i,OGj) from the set of new connection requests S (step 203). A new connection is selected at this step in each subsequent iteration of the method until all connections are established.
3. Select one free egress in the set of egresses OGj associated with the operator network of the new connection request (step 204).
4. Determine if it is possible to establish the connection without rearranging existing connections. Two cases are possible to add the new connection P(i,j):
   (a) there is a second-stage module "a" which is available in both row i of the matrix M (where row i corresponds to the first-stage module requiring connection) and column j of the matrix M (where column j corresponds to the egress selected at point 3). A module is considered to be "available" in a row of the matrix M if it has not already been used in that row of the matrix. Similarly, a module is considered to be "available" in a column of the matrix M if it has not already been used in that column of the matrix. This is shown by step 205, branch "Y". Use module "a" for the new connection, without any rearrangement, (step 206) and return to point 2.
   (b) otherwise, there should be two second-stage modules "a" and "b" such that module "a" is available in row i (i.e. there is a free path between the second-stage module "a" and the first-stage module requiring connection), and module "b" is available in column j (i.e. there is a free path between the second-stage module "b" and the third-stage module of the egress under consideration). This is shown by step 205, branch "N"; step 207. N.B. "a" and "b" are used here as labels for the available second-stage modules.
5. Attempt to rearrange existing connections to accommodate the new connection. Choose "a" on row i and swap "a" with "b" in column j (step 207). If, after the swap, "b" appears twice in the row where the swap has been made, make a new swap "b"→"a" in that row. The process is continued if making a swap causes a symbol to appear twice in the same column (or row) where the swap has just been made. Continue the process, swapping "a"→"b" on the columns and "b"→"a" on the rows each time. The process will alternately operate on the columns and rows. If the following conditions are satisfied an acceptable rearrangement of the matrix is found and the method can return to point 2 (step 208, branch "Y"):
   Each row and column of the matrix M contains no more than one occurrence of "a" or "b". (Indeed, each row and column of the matrix M should contain no more than one occurrence of any of the second-stage module identifiers "a", "b", "c", "d").

No swaps are required in the columns of matrix M that were de-selected at point 1 (step 202).

If the above conditions are not met (step 208, branch "N") the method proceeds to point 6.

6. Revert all of the swaps made at point 5.
7. Choose "b" on the column and visit the row swapping "b" with "a" in such row. If, after the swap, "a" appears twice in the column where the swap has been made, make a new swap "a"→"b" in that column. The process is continued if making a swap causes a symbol to appear twice in the same column (or row) where the swap has just been made. Continue the process swapping "b"→"a" on the rows and "a"→"b" on the columns each time. If the following conditions are satisfied an acceptable rearrangement of the matrix is found and the method can return to point 2:

Each row and column of the matrix M contains no more than one occurrence of "a" or "b". (Indeed, each row and column of the matrix M should contain no more than one occurrence of any of the second-stage module identifiers "a", "b", "c", "d").

No swaps are required in the columns of matrix M that were de-selected at point 1 (step 202).

If the above conditions are not met the method proceeds to point 8.

8. Revert all of the swaps made at point 7.
9. Determine if there is another egress to try (step 210). Select a new free egress "j" (step 211) from a new set $r3(j,k) \subset OGj$ (i.e. work on a new column of the matrix M) and repeat the method from point 4. If there are no free egresses "j" (step 210, branch "N"), continue to next point.
10. Select another operator from the sub-set of operators excluded at step 1 (step 212) and re-select the columns corresponding to that operator in the matrix M. Try again from point 3 until the connection is established. In the worst case, the new connection will be established when all columns of Paull matrix M have been re-selected because the matrix has a rearrangeable non-blocking (RNB) property. When the connection is established, return to point 2 and select the next new connection. Continue the method until all requests for new connections have been fulfilled.

Figure 8A:
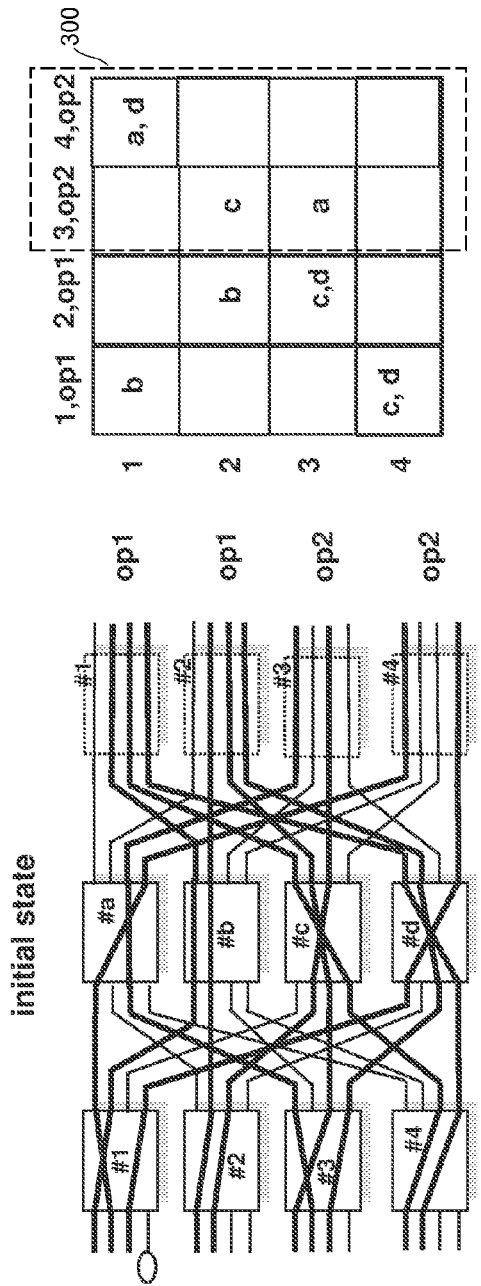

FIGS. 8A-8E show a worked example of establishing a connection using the method described above. FIG. 8A shows an initial configuration of the switching matrix. The third-stage modules of the switching matrix connect to two operator networks op1, op2. Each first-stage module of the switching matrix can connect to four subscribers, giving a total capacity of 16 subscribers. In FIG. 8A, a subscriber connected to the fourth port of module #1 requires connection to operator network op1. Following the method described above:

Step 1: column 3 and 4 of the Paull matrix are de-selected as these columns refer to modules of the switching matrix connected to operator network op2. The dashed box 300 indicates the de-selected columns.

Step 2: only one new connection P(4,op1) is required.

Step 3: select egress 5 (1$^{st}$ egress of the module #2). The attempted connection is P(4,5)—i.e. between port 4 of the first stage and port 5 of the third stage. This corresponds to entry M(1,2) in the matrix.

Step 4.b: in M(1,2) module c is available on the row (i.e. module c has not yet been used on row 1) and module a is available on the column (i.e. module a has not yet been used on column 2).

Step 5: choose module c on the row. A swap c→a is required at M(3,2) because module c now appears twice in the column. This, in turn, requires a swap a→c at M(3,3) because module a now appears twice on row 3. This, in turn, requires a swap c→a at M(2,3) because module c now appears twice on column 3. No further swaps are required because a appears only once on row 2. FIG. 8B shows M after performing the swaps.

Step 5(b): swaps are needed in column 3 of M. Column 3 is one of the de-selected columns of the matrix (within box 300) and thus condition 5(a) is not met.

Step 6: revert all of the swaps made at step 5. This reverts the matrix M to the state shown in FIG. 8A.

Step 7: choose module a on the column. A swap a→c is required at M(1,4) because module a now appears twice on row 1. No further swaps are required because module c appears only once on column 4. FIG. 8C shows M after performing the swaps.

Step 7(b): swaps are needed in column 4 of M. Column 4 is one of the de-selected columns of the matrix (within box 300) and thus condition 7(a) is not met.

Step 8: revert all swaps.

Step 9: select another egress. The new egress is the 1$^{st}$ egress of module #1. The attempted connection is P(4,1)—i.e. between port 4 of the first stage and port 1 of the third stage. This corresponds to entry M(1,1) in the matrix.

Step 4(b): in M(1,1) module c is available on the row and module a on the column.

Step 5: choose module c on the row. A swap c→a is required at M(4,1) because module a now appears twice in the column. No further swaps are required because a appears only once on row 4. FIG. 8D shows M after performing the swaps.

Figure 8E:
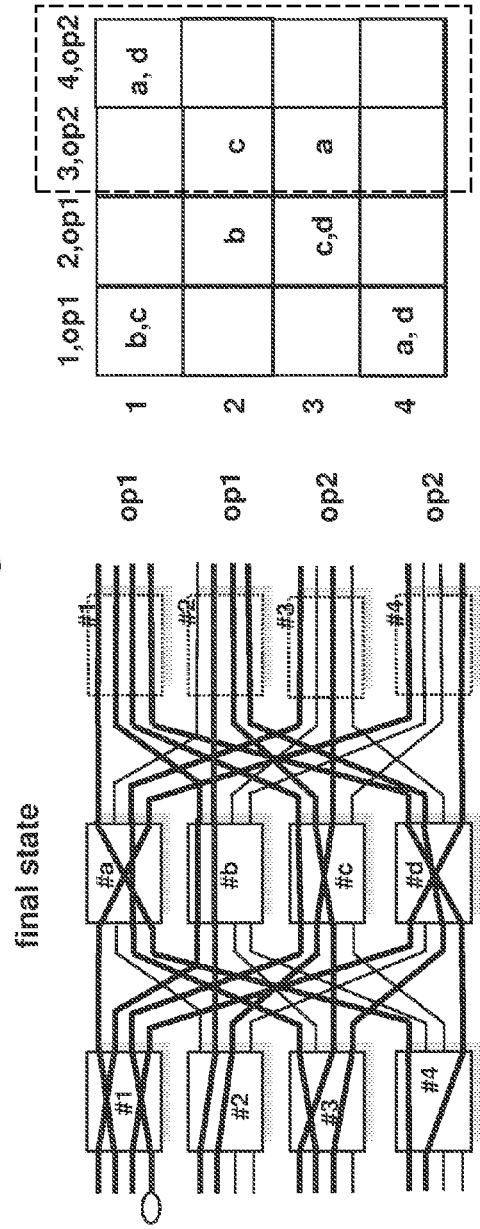
Figures 8B, 8C, 8D:
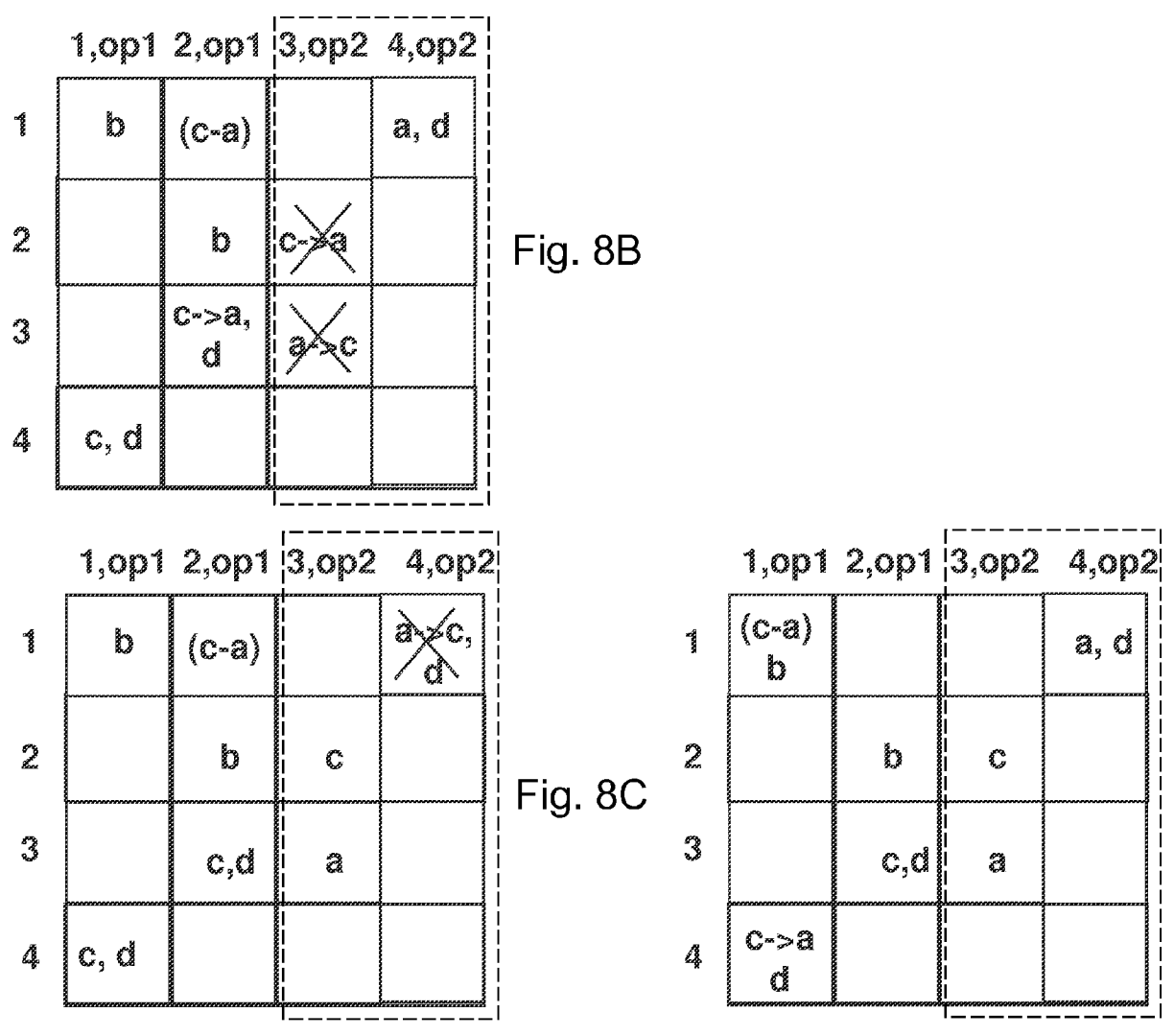

Step 5(a): the conditions are met. Each symbol appears no more than once on each row and column. No swaps were required in de-selected columns. The method can terminate. The final network connection state, and corresponding Paull matrix, is shown in FIG. 8E. The new subscriber is connected to operator network op1 via module #c of the second-stage and port 3 of module #1 of the third-stage. The existing connection between module #4 of the first-stage and module #1 third-stage via module #c of the second-stage has been rearranged to pass via module #a of the second-stage. The connections of subscribers of operator network op2 have not been rearranged.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of controlling a switching matrix which connects to an access network and a set of at least two operator networks, the switching matrix having existing connections established between subscriber terminals and the operator networks; the method comprising:

receiving at least one new request for a new connection between a subscriber terminal in the access network and one of the operator networks, the at least one new request involving a sub-set of the set of operator networks; and establishing the at least one new connection across the switching matrix by:

determining if the at least one new connection can be established across the switching matrix by rearranging only existing connections across the switching matrix to the sub-set of operator networks and, in response, establishing the at least one new connection;

otherwise, rearranging existing connections across the switching matrix to at least one other of the set of operator networks to establish the at least one new connection.

2. A method according to claim 1 wherein the step of establishing the at least one new connection comprises an initial step of determining if the at least one new connection can be established across the switching matrix without rearranging any existing connections across the switching matrix and, in response, establishing the at least one new connection.

3. A method according to claim 1 wherein the step of establishing the at least one new connection by rearranging existing connections to at least one other of the set of operator networks determines if the at least one new connection can be established by rearranging existing connections across the switching matrix to the sub-set of operator networks and one of the other operator networks, and then iteratively allows the rearranging step to rearrange existing connections of a further one of the operator networks which is not involved in the at least one new connection until a connection can be established.

4. A method according to claim 1 wherein the switching matrix comprises a multi-stage switching matrix having at least three stages, with a first stage connecting to the subscriber terminals in the access network and a final stage connecting to the operator networks.

5. A method according to claim 4 wherein each stage of the switching matrix comprises a plurality of modules and wherein each module in the final stage connects to one of the operator networks.

6. A method according to claim 5 wherein the modules in the final stage of the switching matrix are non-switching stages.

7. A method according to claim 5 wherein the switching matrix has three stages and the step of establishing the new connections uses a data matrix with r1 rows, wherein r1 is a number of modules in the first stage, and r3 columns, wherein r3 is a number of modules in the final stage, wherein an (i,j) entry of the data matrix identifies a second stage module used by one of the existing connections between a module "i" of the first stage and a module "j" of the third stage, and wherein the step of determining if the new connection can be established across the switching matrix by rearranging only existing connections across the switching matrix to the first operator network de-selects columns in the data matrix representing second stage modules which do not support connections to the sub-set of operator networks.

8. A method according to claim 7 wherein there is a set S of requests for new connections involving a sub-set of operator networks J, the method comprising:
(a) selecting one of the new connections requiring a path through the switching matrix, the new connection involving a first-stage module i and an operator network in the sub-set of operator networks J;
(b) selecting one free egress connected to the operator network required by the new connection;
(c) determining if there is a second-stage module which is available in both a row i of the data matrix corresponding to the first-stage module i and a column j of the data matrix corresponding to the operator network required by the new connection which will permit the new connection without rearrangement of existing connections;
(d) If step (c) is unsuccessful, selecting two second-stage modules, one of the second stage modules in row i and the other in column j;
(e) determining if the connection can be configured by swapping entries in the data matrix representing existing connections only of those operators in sub-set J;
(f) if the new connection cannot be configured, selecting another free egress corresponding to the operator network required by the new connection and repeating steps (c) to (f); and
(g) if the new connection cannot be established, re-selecting a column in the data matrix which represents a second stage module which support connections to an operator not in the sub-set J and repeating steps (b) to (g) until the new connection can be established.

9. A method according to claim 8:
wherein step (d) including:
selecting a second-stage module "a" which is available in a row i of the data matrix and a second-stage module "b" which is available in a column of the data matrix; and
wherein step (e) including:
selecting "a" on row i and swapping "a" with "b" in column j;
continue the process swapping "a" with "b" and "b" with "a" on the columns and on the rows respectively every time a symbol appears twice in the same row (or column);
if each row and column contains no more than one occurrence of "a" or "b", and no swaps are required in the columns that were de-selected, an acceptable rearrangement of the switching matrix is found, otherwise reverting all swaps;
selecting "b" on column j and swapping "b" with "a" in row i; and
continue the process swapping "b" with "a" and "a" with "b" on the rows and on the columns respectively every time a symbol appears twice in the same column (or row);
if each row and column contains no more than one occurrence of "a" or "b", and no swaps are required in the columns that were de-selected, an acceptable rearrangement of the switching matrix is found, otherwise reverting all swaps.

10. A method according to claim 1, wherein the request for a new connection is at least one of:
a request for a new connection between a new subscriber terminal and an operator network; and
a request for a new connection between an existing subscriber terminal and an operator network which is not currently serving the subscriber terminal.

11. A method according to claim 4 wherein the multi-stage switching matrix is an electrical domain switching matrix.

12. A method according to claim 4 wherein the multi-stage switching matrix is a Clos switching matrix having a first switching stage, a second switching stage and a third non-switching stage.

13. A switching matrix comprising:
ports for connecting to an access network and a set of at least two operator networks;
a controller which is arranged to:
receive at least one new request for a new connection between a subscriber terminal in the access network and one of the operator networks, the at least one new request involving a sub-set of the set of operator networks; and
establish the at least one new connection across the switching matrix by:
determining if the at least one new connection can be established across the switching matrix by rearranging only existing connections across the switching matrix to the sub-set of the set of operator networks and, in response, establishing the at least one new connection;

otherwise, rearranging existing connections across the switching matrix to at least one other of the set of operator networks to establish the at least one new connection.

14. A switching matrix according to claim 13 which comprises multiple switching stages, with a first stage connecting to the subscriber terminals in the access network and a final stage connecting to the operator networks.

15. A switching matrix according to claim 14 wherein each stage of the switching matrix comprises a plurality of modules and wherein each module in the final stage is for connecting to a single one of the operator networks.

16. A non-transitory machine-readable medium comprising instructions which, when executed by a processor, cause the processor to perform a method of controlling a switching matrix which connects to an access network and a set of at least two operator networks, the switching matrix having existing connections established between subscriber terminals and the operator networks; the method comprising:

receiving at least one new request for a new connection between a subscriber terminal in the access network and one of the operator networks, the at least one new request involving a sub-set of the set of operator networks; and establishing the at least one new connection across the switching matrix by:

determining if the at least one new connection can be established across the switching matrix by rearranging only existing connections across the switching matrix to the sub-set of operator networks and, in response, establishing the at least one new connection;

otherwise, rearranging existing connections across the switching matrix to at least one other of the set of operator networks to establish the at least one new connection.

17. The non-transitory machine-readable medium according to claim 16, wherein the step of establishing the at least one new connection of the method comprises an initial step of determining if the at least one new connection can be established across the switching matrix without rearranging any existing connections across the switching matrix and, in response, establishing the at least one new connection.

18. The non-transitory machine-readable medium according to claim 16, wherein the step of establishing the at least one new connection by rearranging existing connections to at least one other of the set of operator networks determines if the at least one new connection can be established by rearranging existing connections across the switching matrix to the sub-set of operator networks and one of the other operator networks, and then iteratively allows the rearranging step to rearrange existing connections of a further one of the operator networks which is not involved in the at least one new connection until a connection can be established.

19. The non-transitory machine-readable medium according to claim 16, wherein the switching matrix comprises a multi-stage switching matrix having at least three stages, with a first stage connecting to the subscriber terminals in the access network and a final stage connecting to the operator networks.

20. The non-transitory machine-readable medium according to claim 19, wherein each stage of the switching matrix comprises a plurality of modules and wherein each module in the final stage connects to one of the operator networks.

21. The non-transitory machine-readable medium according to claim 20, wherein the modules in the final stage of the switching matrix are non-switching stages.

22. The non-transitory machine-readable medium according to claim 20, wherein the switching matrix has three stages and the step of establishing the new connections uses a data matrix with r1 rows, wherein r1 is the number of modules in the first stage, and r3 columns, wherein r3 is the number of modules in the final stage), wherein an (i,j) entry of the data matrix identifies a second stage module used by one of the existing connections between a module "i" of the first stage and a module "j" of the third stage, and wherein the step of determining if the new connection can be established across the switching matrix by rearranging only existing connections across the switching matrix to the first operator network de-selects columns in the data matrix representing second stage modules which do not support connections to the sub-set of operator networks.

\* \* \* \* \*